United States Patent
Takaba et al.

[11] Patent Number: 5,617,169
[45] Date of Patent: Apr. 1, 1997

[54] FILM DETECTION MEMBER FOR A SINGLE-USE CAMERA

[75] Inventors: Tetsufumi Takaba; Masami Fujita; Masaru Yamazaki; Hiroshi Kibayashi; Kazuyoshi Sugano, all of Hino; Shizuo Ishii, Hachioji, all of Japan

[73] Assignee: Konica Corporation, Japan

[21] Appl. No.: 572,888

[22] Filed: Dec. 18, 1995

[30] Foreign Application Priority Data

Dec. 19, 1994 [JP] Japan .................................. 6-335035
Mar. 22, 1995 [JP] Japan .................................. 7-062708

[51] Int. Cl.⁶ .................................................. G03B 1/00
[52] U.S. Cl. .............................................. 396/284; 396/6
[58] Field of Search .................................. 354/212, 214, 354/215, 275, 277, 281

[56] References Cited

U.S. PATENT DOCUMENTS 4,961,085  10/1990  Cho et al. ................................ 354/295
5,231,438  7/1993  Smart ...................................... 354/281

FOREIGN PATENT DOCUMENTS 6-82972  3/1994  Japan .

Primary Examiner—Safet Metjahic
Assistant Examiner—J. K. Han
Attorney, Agent, or Firm—Jordan B. Bierman; Bierman and Muserlian

[57] ABSTRACT

A single-use camera which is loaded with a film cartridge, having a light-shielding cover on a film gate, when the single-use camera is assembled. The camera includes: the film cartridge for accommodating a photographic film; a film-winding knob, capable of rotating, for winding the photographic film; a film detection member for detecting the photographic film at a position outside the film cartridge in the camera; and a mechanism for moving the light-shielding cover to a closed position where the light-shielding cover closes the film gate when the film detection member detects absence of the photographic film at the position.

12 Claims, 15 Drawing Sheets

FILM DETECTION MEMBER FOR A SINGLE-USE CAMERA

BACKGROUND OF THE INVENTION

The present invention relates to a single-use camera wherein a film cartridge is loaded and a photographic film in the cartridge is taken up to be wound around a film-winding member in the camera in advance when the camera is manufactured, and the film is rewound in the cartridge after each photographing so that the exposed film can be taken out of the camera together with the cartridge.

As is disclosed in Japanese Patent Publication Open to Public Inspection No. 75336/1994 (hereinafter referred to as Japanese Patent O.P.I Publication), in some film cartridges, a light-shielding cover is provided in place of a light-shielding member such as a velvet in order to improve light-shielding capability, the light-shielding cover is opened to make a film path to be a through one, and a film-winding spool in the film cartridge is rotated in the direction for feeding a photographic film out so that the film may be fed out through the film path of the film cartridge.

In the case of a camera wherein a film cartridge is loaded, when the camera is equipped with a motor, it is possible to close a light-shielding cover after completion of photographing by driving the motor, as disclosed in Japanese Patent O.P.I. Publication No. 82972/1994.

However, in the case of an inexpensive single-use camera, no motor is used. Therefore, when a film cartridge is used, and when the film cartridge is taken out while a light-shielding cover thereon is opened in a photofinishing laboratory, a photographic film is fogged. So, it is not possible to take a film out in a daylight room, which is different from the way in the past, and darkroom unloading is required.

Therefore, the preferable is the constitution wherein a light-shielding cover is closed automatically after completion of photographing, and inventors of the invention accomplished an example wherein a detecting member which detects the last end of a film is provided, and an opened light-shielding cover is closed automatically by the detection of the detecting member.

In the case of the foregoing, the light-shielding cover is closed simultaneously with detection of the last end of a film. At this moment, however, the last end of a film is not usually wound in a cartridge, and there is a possibility that the film is wound in a cartridge with its last end sandwiched by the light-shielding cover. Therefore, there is a fear that a film is scratched, or the light-shielding cover is subjected to irregular force, resulting in deterioration of light-shielding capability.

Therefore, the inventors of the invention accomplished another example wherein a film-winding knob makes the predetermined number of turns after the detection of the last end of a film, and thereby a light-shielding cover is closed after the film has been wound in a cartridge.

SUMMARY OF THE INVENTION

The first example of the invention is represented by a single-use camera which is loaded in advance, when it is assembled, with a film cartridge having a mechanism for feeding out, through rotation of a film-winding spool in its feeding-out direction, a photographic film that is loaded in a cartridge main body through an opened light-shielding cover, wherein there are provided a cover-closing member that engages with the light-shielding cover, a cover-closing-member-urging means that constantly urges the cover-closing member to be closed, a film detection lever which detects whether or not the light-shielding cover is opened and a photographic film is showing out of a cartridge main body, a locking member that operates interlocking with the film detection lever and regulates the operation of the cover-closing member, and a lever-urging means the film detection lever to be in contact with the photographic film constantly, and thereby the locking member locks the operation of the cover-closing member in its closing direction under the condition that the film detection lever is in contact with the photographic film, it operates when the film detection lever leaves the photographic film when it is wound up, being interlocked with this, the locking member operates to release the operation locking for the cover-closing member in its closing direction, and the light-shielding cover is closed.

The first example is further represented by a single-use camera wherein a film-winding knob is engaged with a film-winding spool of the film cartridge so that film-winding may be possible, and a window portion through which the cover-closing member can be observed is formed on the film-winding knob.

In the first example, there is provided a film cartridge having thereon a light-shielding cover which can be closed firmly, which is laborsaving in a photofinishing laboratory, and film fogging can be avoided.

In particular, when a photographic film exists, the urging means is locked to make the light-shielding cover to be in its open state, and when the photographic film does not exist, the urging means is released from its locked state to make the light-shielding cover to be in its closed state. In this way, when a photographic film is wound up, it is possible to close the light-shielding cover automatically and surely without using a motor, which is laborsaving in a photofinishing laboratory, and film fogging can be avoided.

Further, under the condition that a film detection lever is in contact with a photographic film, a locking member locks the operation of a cover-closing member in the closing direction, and a light-shielding cover is opened. On the other hand, it operates when the winding up of a photographic film makes the film detection lever to leave the photographic film, and interlocking with this, the locking member operates to release the operation locking of the cover-closing member in the closing direction and thereby to close the light-shielding cover. In this way, when a photographic film is wound up, it is possible to close the light-shielding cover automatically and surely without using a motor, which is laborsaving in a photofinishing laboratory, and film fogging can be avoided.

Further, after finishing photographing by winding up a photographic film by a film-winding knob, when the film-winding knob is rotated for position adjustment, it is possible to observe a cover-closing member of a film cartridge through a window portion of the film-winding knob, and thereby to make sure easily that the light-shielding cover is closed. Even when film-winding by means of a film-winding knob is finished, when the light-shielding cover is in its open state due to malfunction of the cover-closing member or the like, a tool is inserted through the window portion to operate the cover-closing member so that the light-shielding cover may be closed.

The second example of the invention is represented by a single-use camera which is loaded in advance, when it is assembled, with a film cartridge housing therein an unexposed film and having a rotary light-shielding cover at a film gate, wherein there are provided a film-winding knob that is rotated to wind up a film, a detection member that engages with the film-winding knob and detects existence of a film, and a closing member that closes the light-shielding cover by engaging with the light-shielding cover, and when the detection member detects that a film does not exist, the closing member is operated after the film-winding knob makes a predetermined rotation so that the light-shielding cover may be closed.

Further, in the single-use camera mentioned above, there are provided a film-winding knob which is provided with a circular wall portion having therein a cutout in a predetermined range and winds up a film by rotating, a closing member has a first engagement portion capable of contacting the wall portion of the film-winding knob and engages with the light-shielding cover and closes the light-shielding cover by rotating the first engagement portion in the direction for contacting the wall portion, a first urging member urging the closing member in the direction for closing the light-shielding cover, and a second urging member which has the second engagement portion capable of contacting the wall portion of the film-winding knob and has the third engagement portion holding the rotation of the closing member, and urges a detecting member pivoted rotatably to be capable of contacting a film at its one end and the aforesaid detecting member in the direction for contacting the film, and when the film contacting the one end of the detecting member is retreated by rotation of the film-winding knob and when contact between the second engagement portion and the wall portion of the film-winding knob is released and thereby the second engagement portion is urged by the second urging member to swing in the cutout, the third engagement portion releases the engagement of the closing member, while, when contact between the first engagement portion and the wall portion is released by the succeeding predetermined rotation of the film-winding knob, the closing member is urged by the first urging member to rotate for closing the light-shielding cover.

In the third example, in the single-use camera mentioned above, there are provided a film-winding knob which has the first gear and winds up a film by rotating, a detection member whose rotation axis is coaxial with that of the film-winding knob and whose one end comes in contact with a film, a closing member that closes the light-shielding cover by rotating, the second gear formed unitedly with the closing member, a planetary gear which is pivoted on the detection member rotatably and engages constantly with the first gear and is capable of engaging with the second gear, and an urging member that urges the detection member in the direction of engagement of the planetary gear with the second gear, and when the film is in contact with one end of the detection member, the planetary gear does not engage with the second gear by resisting an urging force of the urging member, while when the rotational operation of the film-winding knob makes the film being in contact with one end of the detection member to retreat, the detection member receives the urging force of the urging member to rotate, thereby the planetary gear engages with the second gear and the light-shielding cover is closed by the rotation of the second gear.

DETAILED DESCRIPTION OF THE INVENTION

Figure 1:
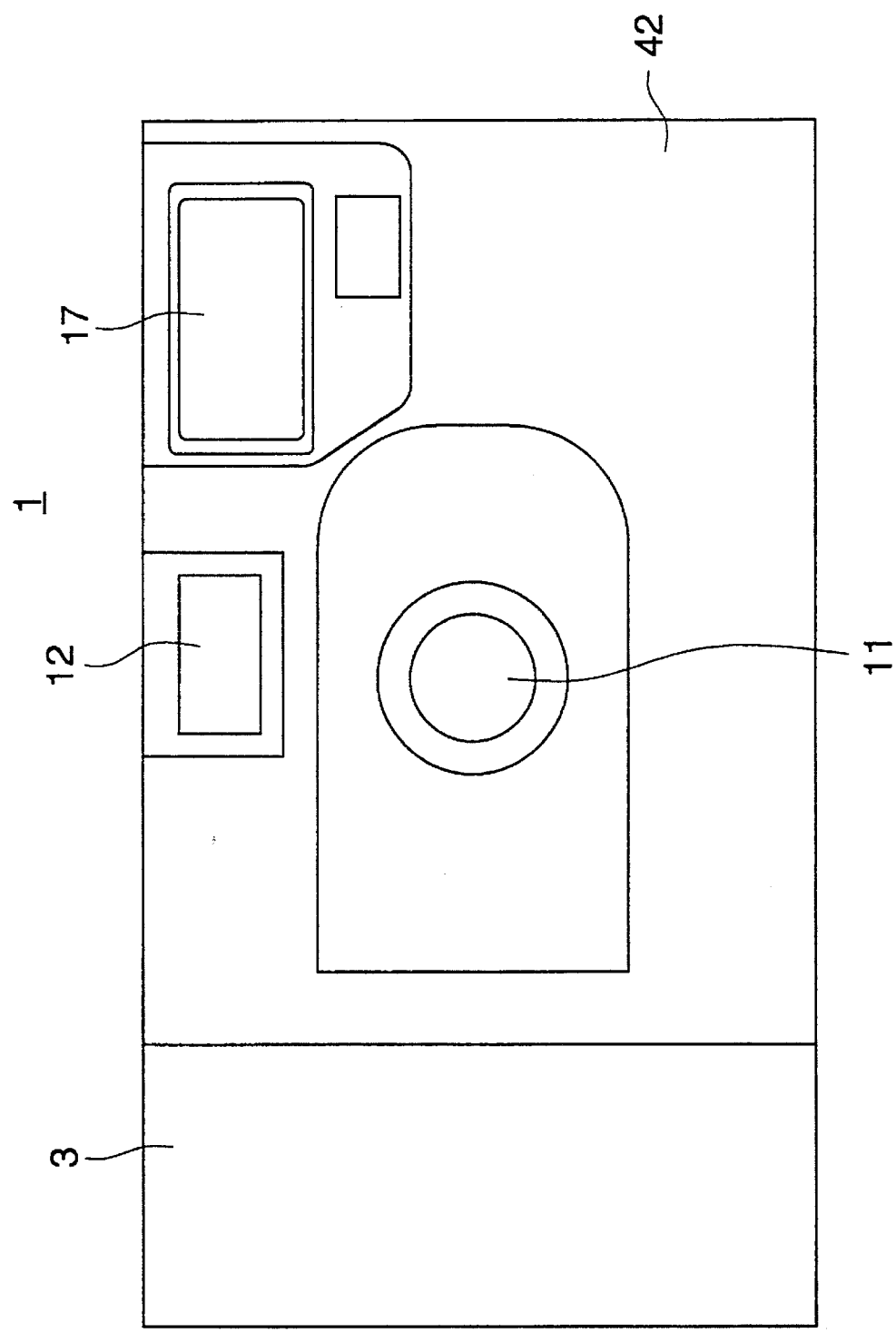
FIG. 1 is a front view of a single-use camera.
Figure 2:
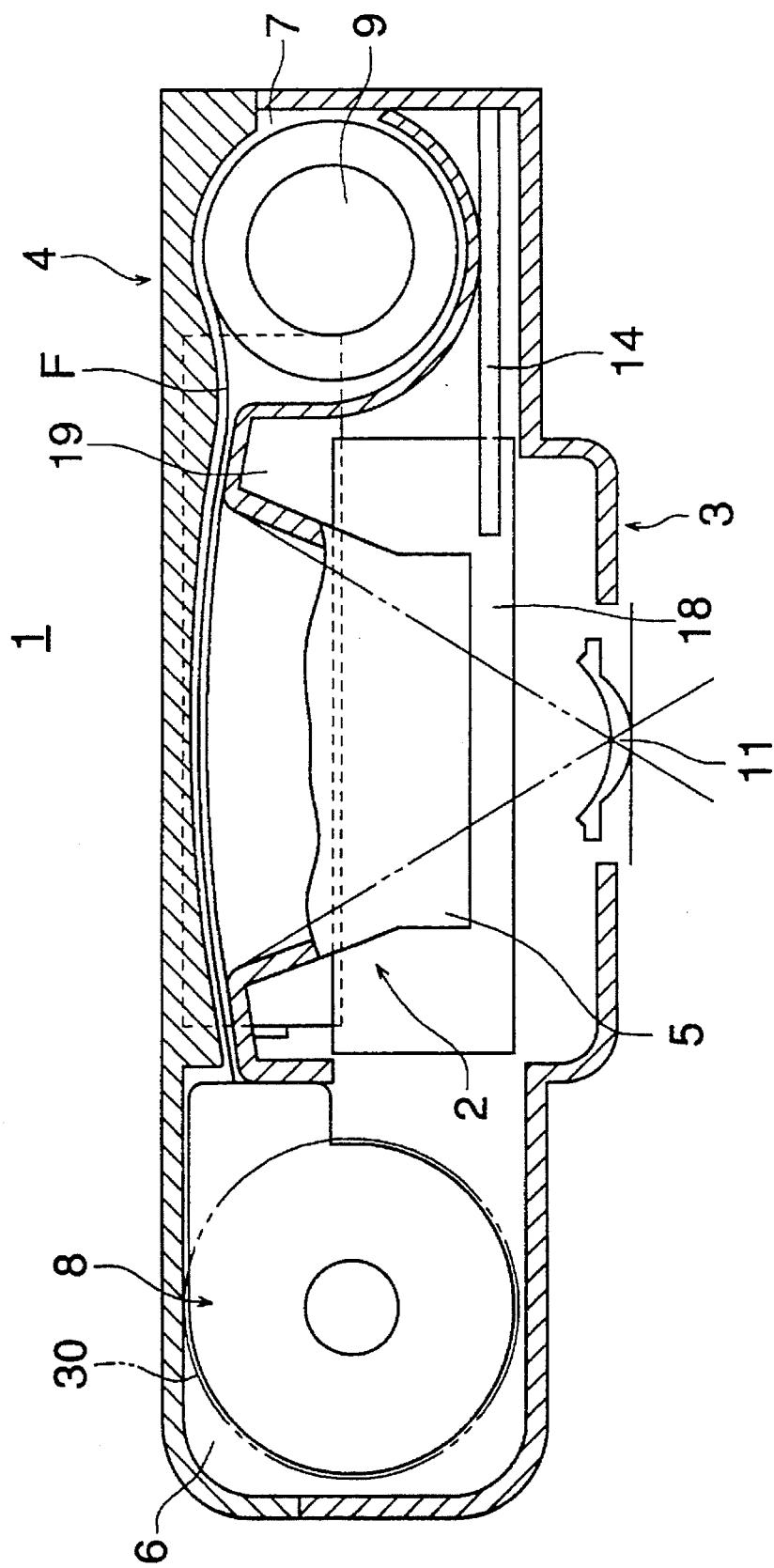
FIG. 2 is a plan view illustrating the internal structure of the single-use camera.
Figure 3:
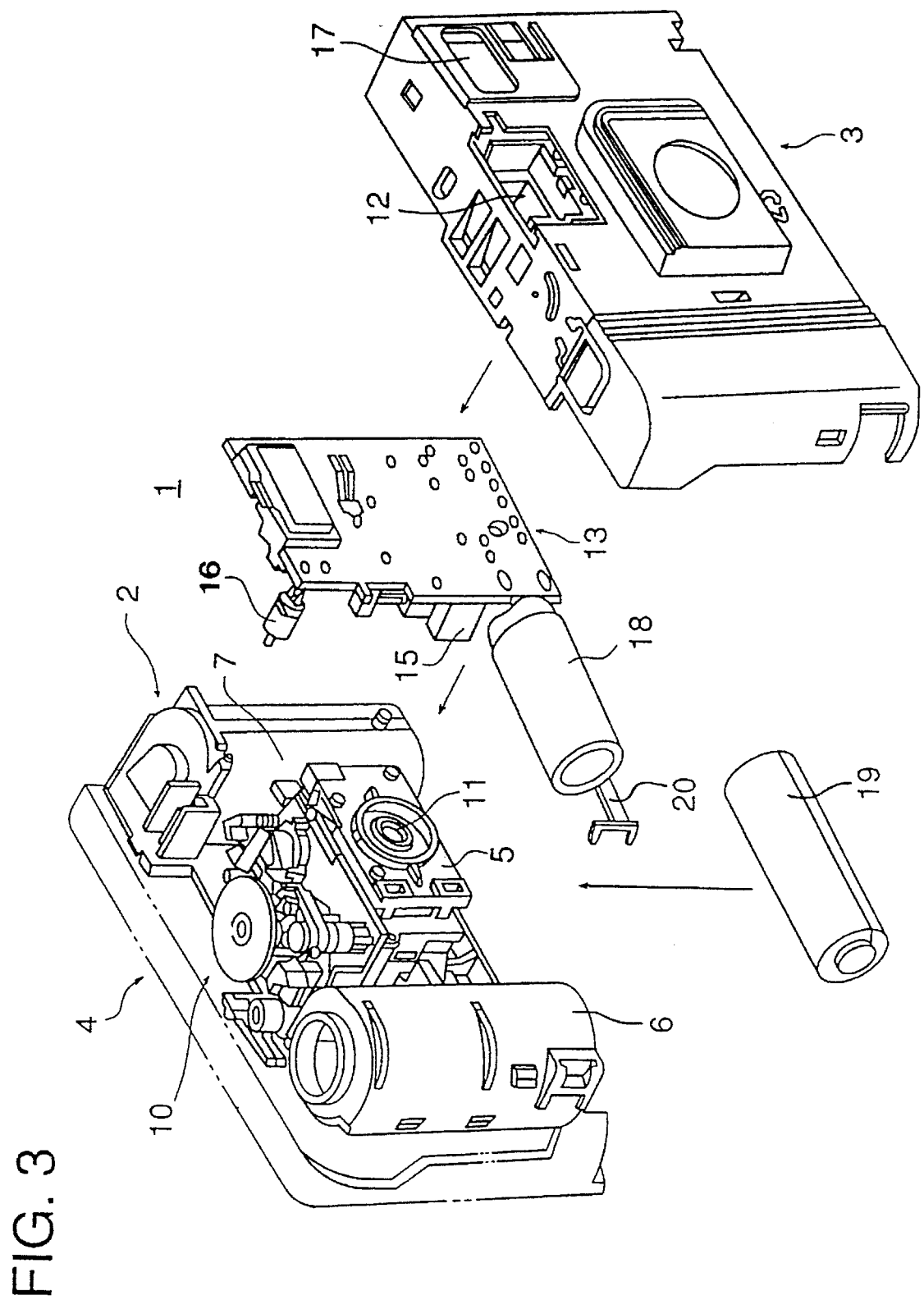
FIG. 3 is an exploded perspective view of the single-use camera.

A single-use camera will be explained as follows, referring to FIGS. 1–4. The single-use camera 1 is a simple camera loaded with a photographic film to be available on the market. A photographic film is loaded in a camera in the course of assembling step of the camera so that neither film loading nor film rewinding is required for a user, and a user can photograph immediately.

The single-use camera 1 is assembled in a way that front cover 3 and rear cover 4 are affixed on main body 2. At the central portion of the main body 2, there is provided photographing frame 5, and cartridge chamber 6 is provided on one side of the photographing frame 5 while film roll cheer 7 is provided on the other side thereof. In the cartridge chamber 6, there is loaded film cartridge 8, and in the film roll chamber 7, there is housed photographic film F that is wound around spool 9, and this photographic film F ms taken up into the film cartridge 8 by film-winding mechanism 10 for each photographing.

The film-winding mechanism 10 is composed of film-winding knob 30 and others, and is positioned above the cartridge chamber 6 and the photographing frame 5. On the front side of the photographing frame 5, there is provided camera lens 11. Above the photographing frame 5, there is arranged view-finder 12.

On the single-use camera 1, there is provided strobe unit 13. Strobe base board 14 of the strobe unit 13 is affixed on the front side of the film roll chamber 7. The strobe base board 14 is wired with circuit element 15, and at upper position thereof, there is connected discharge tube 16 which faces strobe window 17 of the front cover 3. At the lower position of the strobe base board 14, there is connected main capacitor 18, and power supply battery 19 is connected to the strobe base board 14 through lead plate 20. Voltage charged in the main capacitor 18 by the power supply battery 19 causes the discharge tube 16 to emit light.

Figure 4:
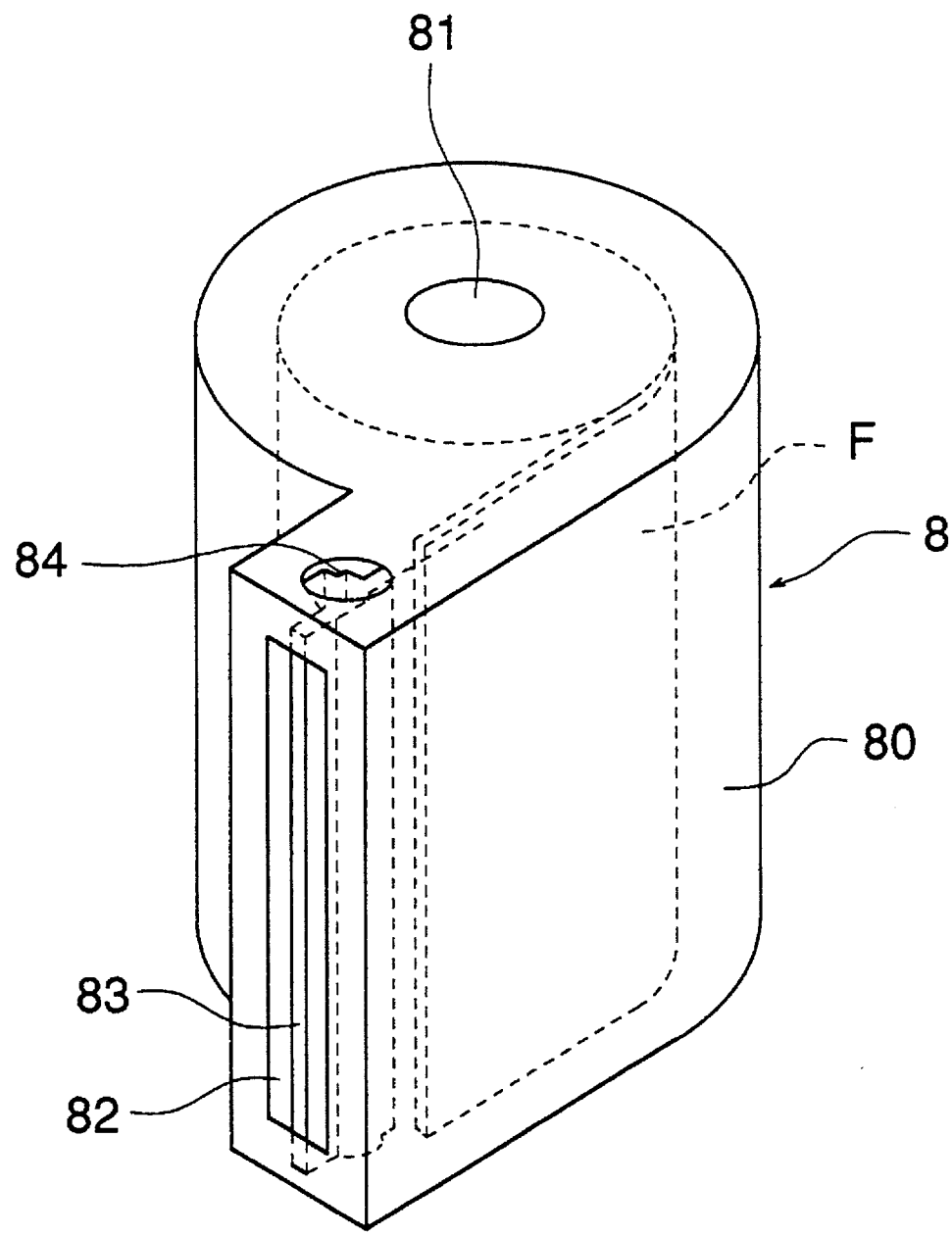
FIG. 4 is a perspective view showing a conventional film cartridge.

As shown in FIG. 4, film cartridge 8 is composed of cartridge main body 80, photographic film F wound around film-winding spool 81 and film-winding spool 81, and of light-shielding cover 83 which shields film gate 82 against light, and is structured as disclosed in Japanese Patent O.P.I. Publication No. 75336/1994. The light-shielding cover 83 is embedded rotatably in cartridge main body 80, and key 84 is formed on one end of the light-shielding cover 83.

Figure 5:
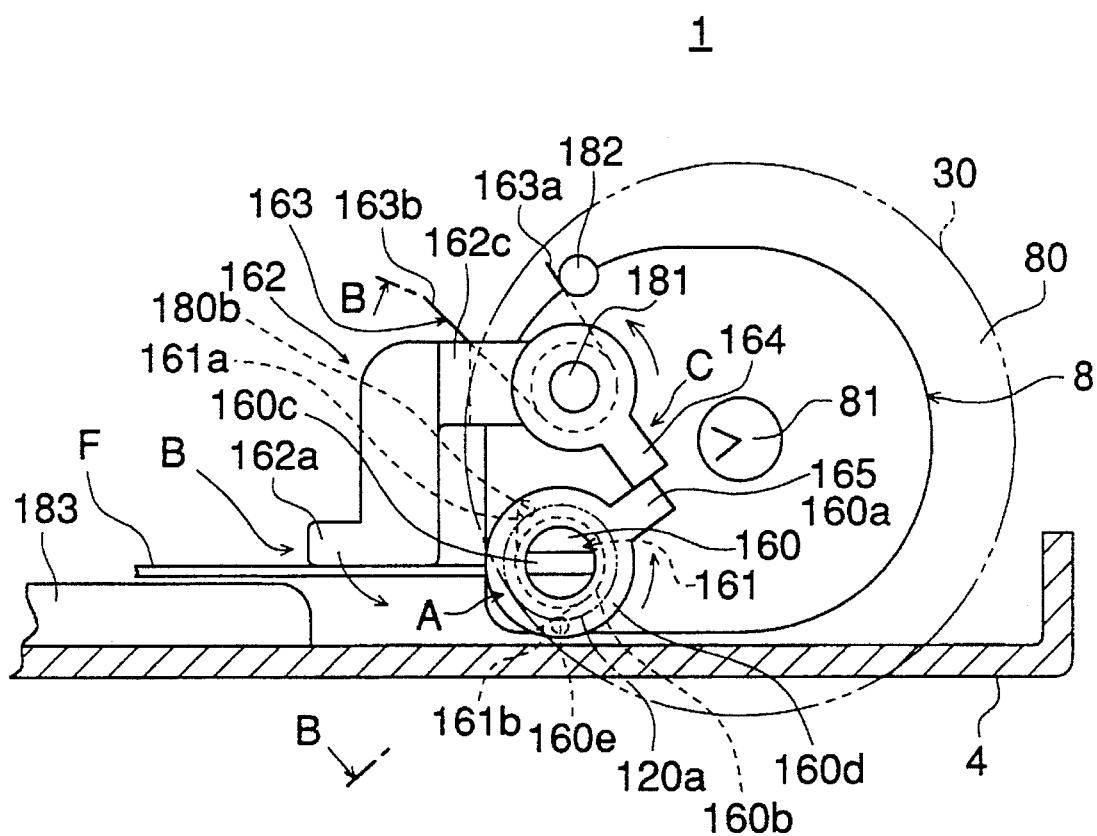
FIG. 5 is a plan view of a loading section for a film cartridge in the first example.
Figure 6:
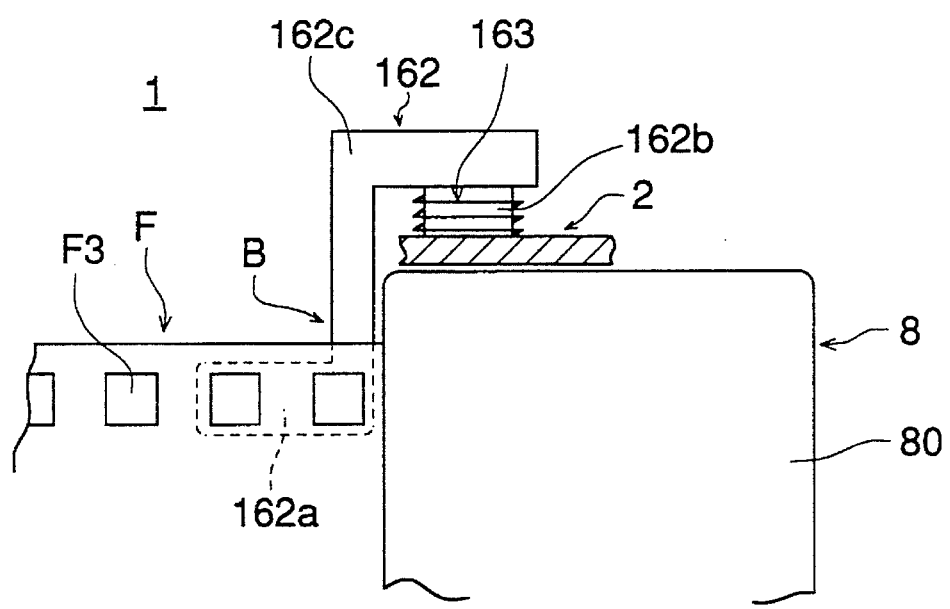
FIG. 6 is a side view of a loading section for a film cartridge with a rear cover removed in the first example.
Figure 7:
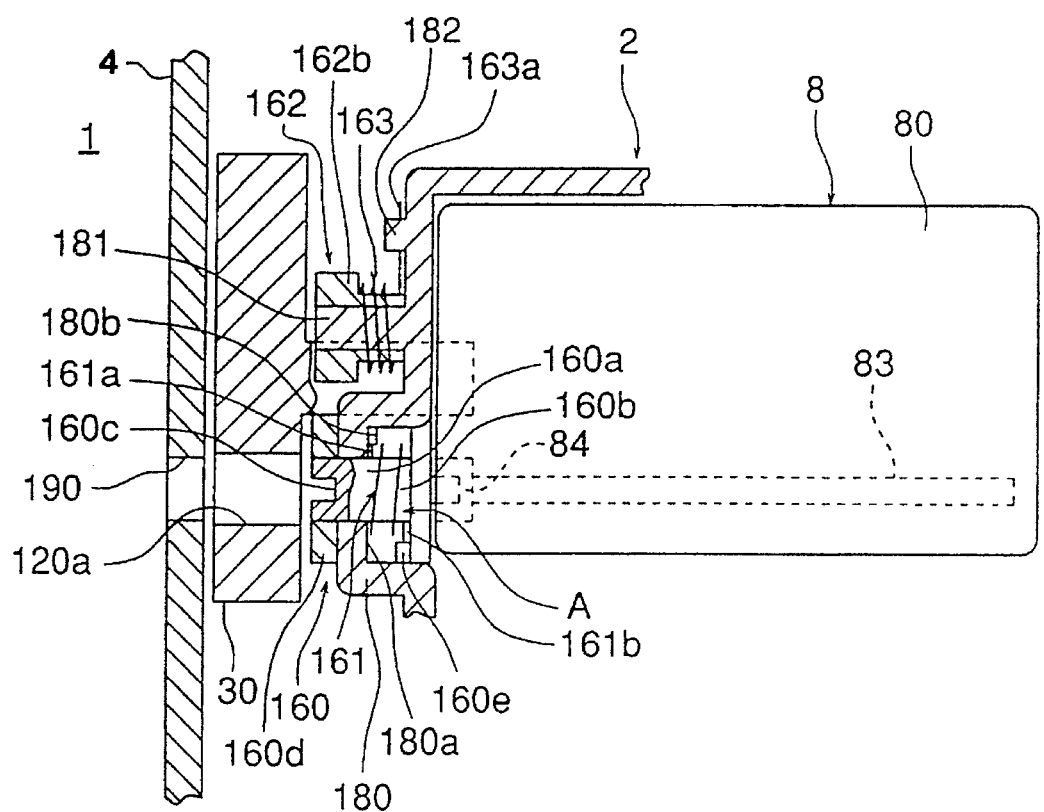
FIG. 7 is a sectional view taken on line B—B in FIG. 5.

FIGS. 5–7 represent drawings showing mechanisms for closing a light-shielding cover of a film cartridge in the first example of the invention, and FIG. 5 is a plan view of a loading section for a film cartridge, FIG. 6 is a side view of a loading section for a film cartridge under the condition that the rear cover is removed, and FIG. 7 is a sectional view taken on line B—B in FIG. 5.

The single-use camera 1 is equipped with urging means A that constantly urges light-shielding cover 83 in its closing direction, film detection means B which detects existence of photographic film F showing from cartridge main body 80 through the opened light-shielding cover 83 and lock means C which locks the urging means A to make the light-shielding cover 83 to be opened when photographic film F exists, and releases locking of the urging means A to make the light-shielding cover 83 to be closed when photographic film F does not exist.

Namely, key 84 of the light-shielding cover 83 of film cartridge 8 is engaged with shaft portion 160a of cover closing member 160, and on the shaft portion 160a, there is formed inner flange portion 160b, and the shaft portion 160a is inserted through supporting portion 180 to be rotatable with the inner flange portion 160b supported by recessed portion 180a of supporting portion 180. On the top of the shaft portion 160a, there is formed engaging groove 160c and the top portion is further engaged with outer flange portion 160d. On the shaft portion 160a of the cover closing member 160, there is provided coil spring 161 whose one end 161a is hooked on protrusion 180b of supporting portion 180, while the other end 161b is hooked on protrusion 160e of the inner flange portion 160b, and cover closing member 160 is constantly urged in the closing direction by coil spring 161 which constitutes an urging means for the cover closing member. Urging means A which constantly urges the light-shielding cover 83 in its closing direction is structured by the urging means for the cover closing member and the cover closing member 160.

On the shaft portion 181 of the main body 2, film detection lever 162 is provided rotatably, and film detection portion 162a of the film detection lever 162 is arranged to be in contact with photographic film F appearing from cartridge main body 80 with opened light-shielding cover 83 to detect existence of photographic film F. On the shaft portion 162b of the film detection lever 162, there is provided coil spring 163 whose one end 163a is hooked on convex portion 182 on the main body 2, while the other end 163b thereof is hooked on the step portion 162c of the film detection lever 162. The film detection lever 162 is constantly urged in the direction to come in contact with photographic film F by the coil spring 163, and the coil spring 163 constitutes a lever urging means which constantly urges the film detection lever 162 in the direction to come in contact with photographic film F.

Film detection portion 162a of the film detection lever 162 is arranged to come in contact with the position of perforation F3 of photographic film F. Thus, scratches on images can be avoided by the contact of the film detection portion on the position that is out of exposure area on the film. Further, the film detection portion 162a is formed to be greater than an external form of a perforation F3 of the photographic film F to prevent that the film detection portion 162a is caught by the perforation F3.

Photographic film F of film cartridge 8 is wound up while being guided by rib-shaped film guide 183 formed on the rear cover 4, and when leading edge portion F1 of the photographic film F comes off the film guide 183, film detection lever 162 operates in the arrowed direction. This film detection lever 162 constitutes film detection means B which detects existence of photographic film F appearing from cartridge main body 80 with light-shielding cover 83 opened.

On the film detection lever 162, there is formed integrally locking member 164 which is engaged with stopper 165 formed integrally with outer flange portion 160d of cover closing member 160 to regulate operations of the cover closing member 160.

The locking member 164 operates interlocking with the film detection lever 162, and under the condition that film detection portion 162a of the film detection lever 162 is in contact with photographic film F, the locking member 164 is engaged with stopper 165 to lock the operation of the cover closing member 160 in its closing direction. Under this state, the light-shielding cover 83 of film cartridge 8 is opened and photographic film F is wound up.

After the photographic film F has been wound up, when the leading edge portion F1 comes off the film guide 183, thereby the film detection lever 162 operates in the arrowed direction, and the film detection portion 162a leaves the photographic film F, locking member 164 operates interlocking with the foregoing to be disengaged from the stopper 165, thus, the locking of operations of the cover closing member 160 in its closing direction is released. Thereby, the cover closing member 160 is caused by coil spring 163 to operate in its closing direction for closing the light-shielding cover 83.

The locking member 164 and the stopper 165 constitute locking means C which locks urging means A to cause the light-shielding cover 83 to be in its opened state when photographic film F exists, and releases the locking of the urging means A to cause the light-shielding cover 83 to be in its closed state when photographic film F does not exist.

As stated above, locking member 164 engages with stopper 165 to lock the operation of cover closing member 160 in its closing direction to cause the light-shielding cover 83 to be in its opened state, under the condition that film detection lever 162 is in contact with photographic film F. On the other hand, when film detection lever 162 is separated from photographic film F by winding up of photographic film F, it operates in the arrowed direction, and interlocking with this, locking member 164 operates to be disengaged from stopper 165 for releasing the locking of operations of cover closing member 160 in its closing direction, thus, the light-shielding cover 83 is closed. As stated above, when photographic film F is wound up, the light-shielding cover 83 can be closed surely and automatically by the use of no motor, which is labor-saving and effective for prevention of film fogging in a photofinishing laboratory.

Further, on film-winding knob 30, there is formed window portion 120a through which the cover closing member 160 can be seen. When taking out film cartridge 8 from single-use camera 1, it is possible to look the inside through viewing window 190 formed on the rear cover 4, to align window portion 120a by turning film-winding knob 30, and to look cover closing member 162 of film cartridge 8. Thus, it is possible to confirm easily that the light-shielding cover 83 is closed. When engagement groove 160c formed on the tip of shaft portion 160a of cover closing member 160 is in the direction of transporting photographic film F, the light-shielding cover 83 is opened, while when the engagement groove is in the direction perpendicular to that of transporting photographic film F, the light-shielding cover 83 is closed.

When the light-shielding cover 83 is caused by malfunction of cover closing member 160 to be in its opened condition even when film-winding by means of film-winding knob 30 has been finished, a tool is inserted from the viewing window 190 formed on the rear cover 4 through window portion 120a of the film-winding knob 30 to operate cover closing member 160 for closing the light-shielding cover 83.

Figure 8:
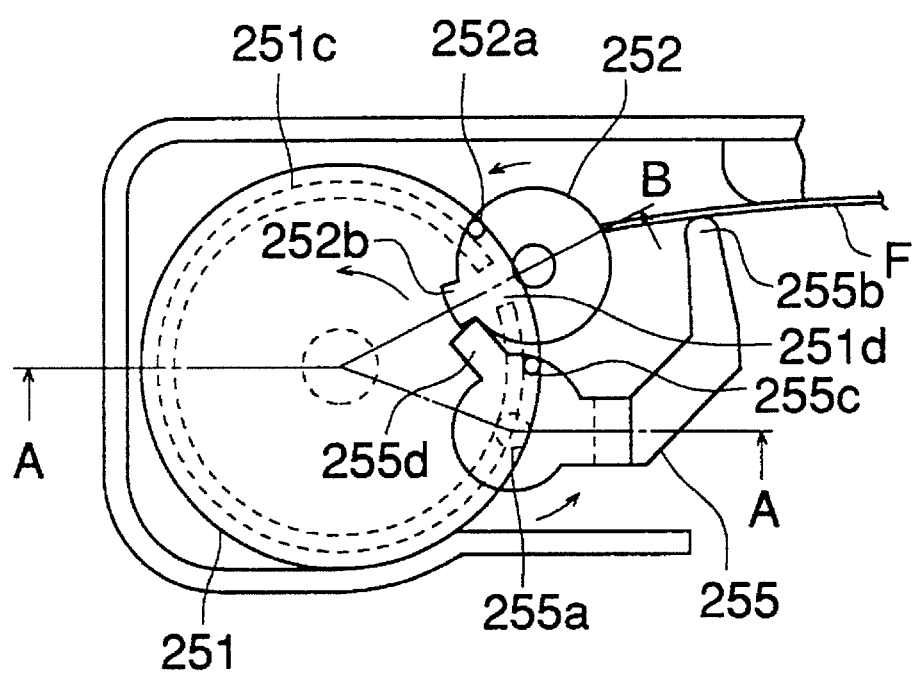
FIG. 8 is a plan view in the second example.
Figure 9:
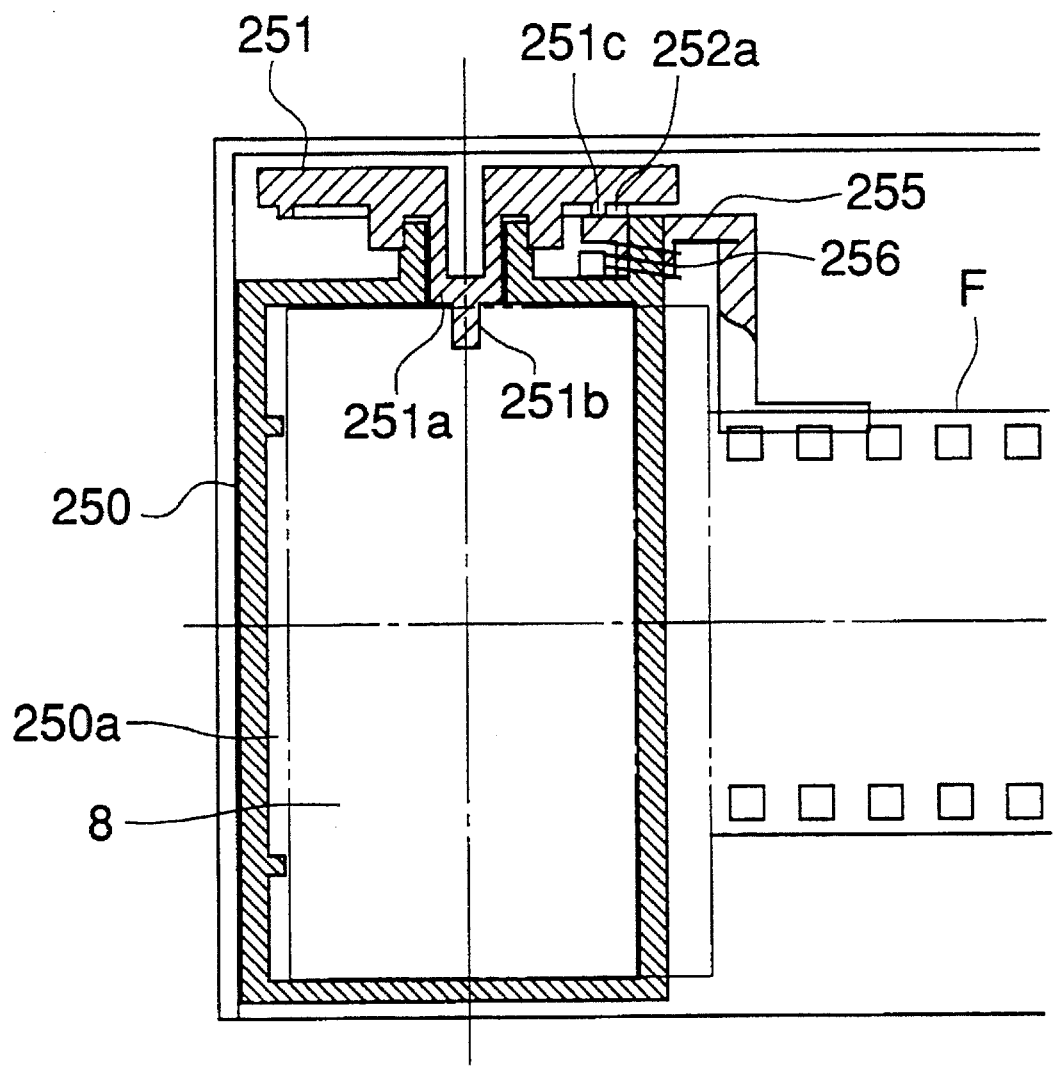
FIG. 9 is a sectional view taken on line A—A in FIG. 8.
Figure 10:
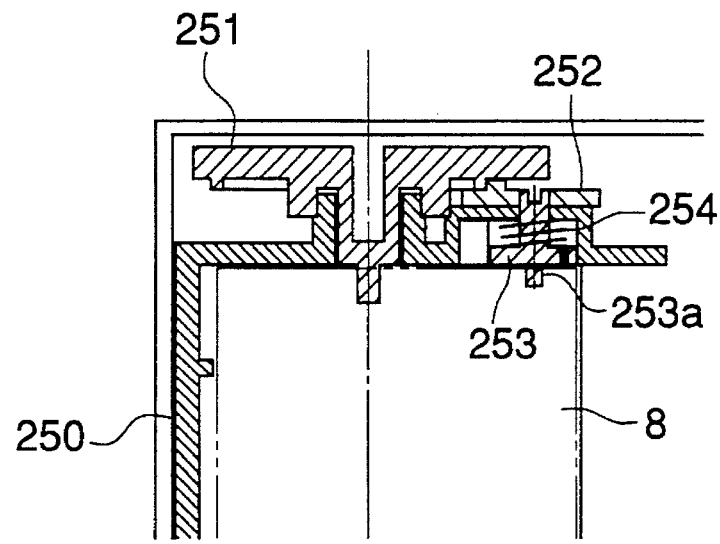
FIG. 10 is a sectional view taken on line A–B in FIG. 8.
Figure 11:
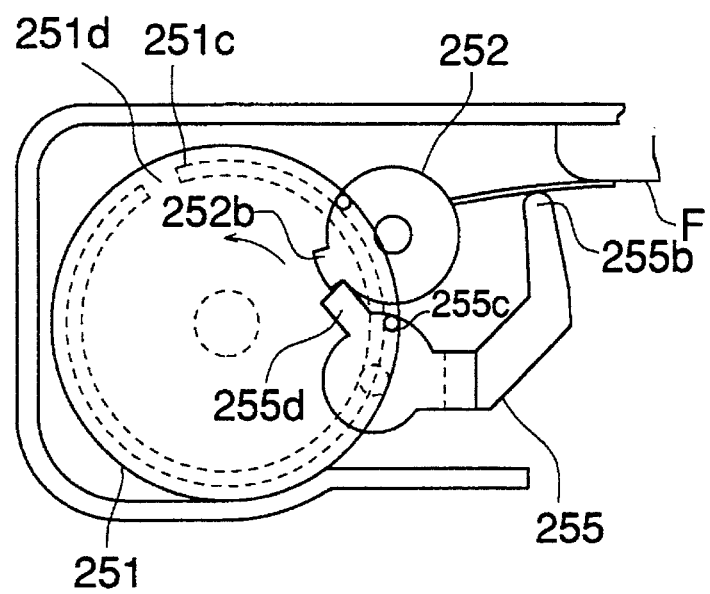
FIG. 11 is a plan view wherein a film-winding knob in FIG. 8 is rotated.
Figure 12:
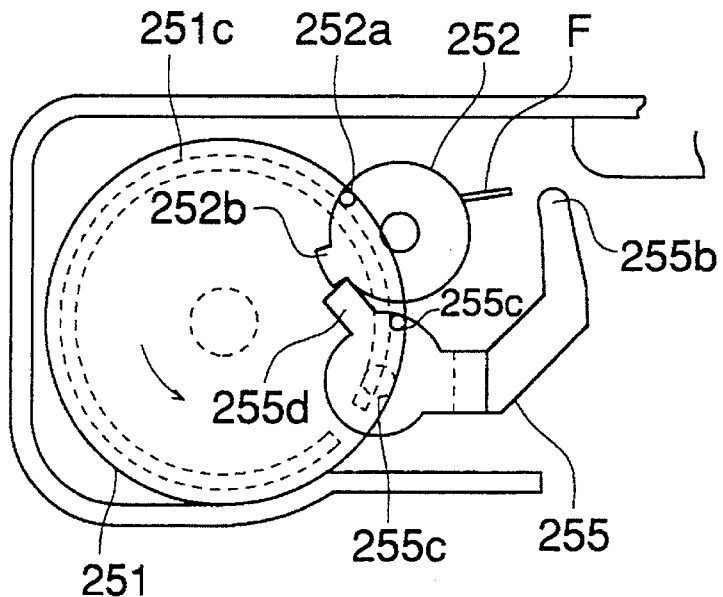
FIG. 12 is a plan view wherein a film-winding knob in FIG. 11 is further rotated.
Figure 13:
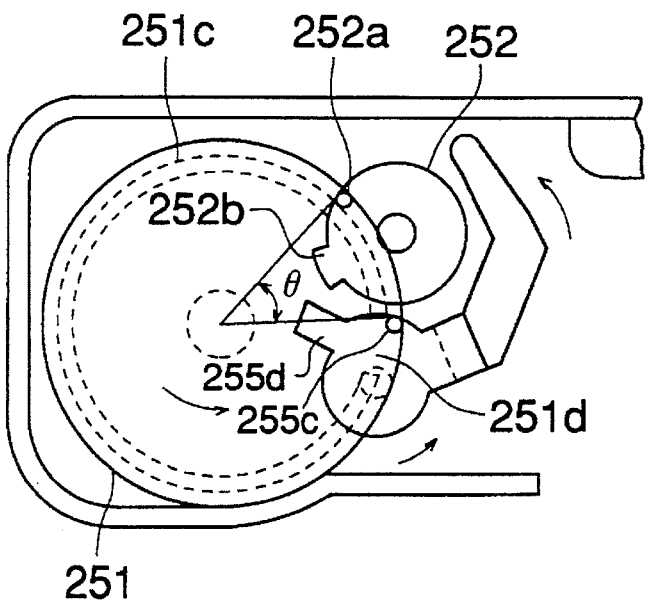
FIG. 13 is a plan view wherein a film-winding knob in FIG. 12 is further rotated.
Figure 14:
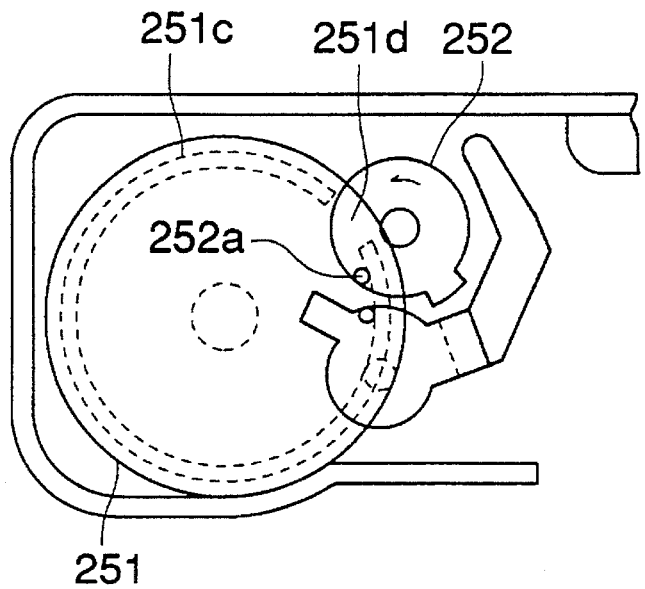
FIG. 14 is a plan view wherein a film-winding knob in FIG. 13 is further rotated.

The second example of the invention will be explained as follows, referring to FIG. 8–14. FIG. 8 is a plan view of the second example, FIG. 9 is a sectional view taken on line A—A in FIG. 8, FIG. 10 is a sectional view taken on line A–B in FIG. 8, FIG. 11 is a plan view wherein a film-winding knob is rotated from the state in FIG. 8, FIG. 12 is a plan view wherein the film-winding knob is further rotated from the state in FIG. 11, FIG. 13 is a plan view wherein the film-winding knob is further rotated from the state in FIG. 12, FIG. 14 is a plan view wherein the film-winding knob is further rotated from the state in FIG. 13. Incidentally, each plan view shows only main portions.

In each drawing, the numeral 250 represents a main body which holds each structural part and is loaded with cartridge 8 shown in FIG. 4 which is loaded in cartridge chamber 250a in the course of assembling in advance. The numeral 251 is a film-winding knob which is fit rotatably, through its shaft portion 251a, in main body 250 and is engaged with winding spool 81 of cartridge 8 shown in FIG. 4. Therefore, when the film-winding knob 251 is rotated, film F is wound in the cartridge 8.

The numeral 252 is a closing member which is formed integrally with closing shaft 253 that is fit in the main body 250, and tip portion 253a of the closing shaft 253 is engaged with key 84 of cartridge 8 shown in FIG. 4. Further, closing member spring 254 is provided to be wound around the closing shaft 253 so that the closing member 252 may be urged counterclockwise, namely in the direction in which light-shielding cover 83 shown in FIG. 4 is closed by tip portion 253a of closing shaft 253 through key 84. In addition, protrusion 252a that is a first engagement portion is provided on the closing member 252, and when the closing member 252 rotates counterclockwise, the protrusion 252a comes in contact with wall portion 251c provided in a shape of a circumference on film-winding knob 251. Incidentally, cutout portion 251d where the wall portion is partially eliminated is provided on the wall portion 251c.

The numeral 255 is a detecting member that detects existence of a film, and it is fit rotatably in main body 250 through hole 255a with its end portion 255b being in contact with film F. Further, the detecting member is provided with spring for detecting member 256 which is wound around the detecting member to urge it counterclockwise, namely, in the direction that the end portion 255b comes in contact with film F. In addition, protrusion 255c that is a second engagement portion is provided on the detecting member, and when the detecting member 255 rotates counterclockwise, the protrusion 255c comes in contact with the wall portion 251c of the film-winding knob. The detecting member 255 is further provided with protrusion 255d that is a third engagement portion which engages with protruded portion 252b provided on closing member 252 for preventing that the closing member 252 rotates counterclockwise.

Operations in the constitution mentioned above will be explained as follows, referring to FIGS. 11–14.

FIG. 11 is a diagram wherein film-winding knob 251 in FIG. 8 is further rotated counterclockwise. Owing to this, the film F is taken up more than in FIG. 8, but the end portion 255b of the detecting member 255 is still in contact with the film F, and the detecting member 255 is prevented by the film F from rotating counterclockwise accordingly. In the same manner as in FIG. 8, therefore, engagement between the protrusion 255d of the detecting member 255 and the protrusion of the closing member 252 is held.

FIG. 12 is a diagram wherein film-winding knob 251 is further rotated counterclockwise. Due to this, the film F is further taken up, and thereby end portion 255b of the detecting member 255 leaves the film F, and the detecting member 255 is urged counterclockwise by spring for detecting member 256. However, the protrusion 255c is engaged with wall portion 251c and thereby the detecting member 255 is prevented from rotating, and closing member 252 is held to be in the same pose as in FIG. 10.

FIG. 13 is a diagram wherein film-winding knob 251 is further rotated counterclockwise. Owing to this, the film F is further taken up, and the wall portion 251c of film-winding knob 251 rotates, and thereby engagement between protrusion 255c of detecting member 255 and the wall portion 251c is released. Therefore, the protrusion 255c is urged by spring for detecting member 256 to swing in cutout portion 251d, which means that detecting member 255 rotates counterclockwise, and protruded portion 255d is disengaged from protruded portion 252b of the closing member 252. However, protrusion 252a of the closing member 252 is only in contact with wall portion 251c of film-winding knob 251, thus, the closing member 252 is held to be in the same pose as in FIG. 10.

FIG. 14 is a diagram wherein film-winding knob 251 has further been rotated counterclockwise by an angle θ in FIG. 13. Due to this, the wall portion 251c of the film-winding knob 251 is also rotated, and thereby engagement between the wall portion 251c and protrusion 252a of the closing member 252 is released, and spring for detecting member 254 urges the protrusion 252a to move in cutout portion 251d, thus, the closing member 252 rotates counterclockwise by about 90° and closes the light-shielding cover 83 of cartridge 8 engaged as stated above.

As stated above, the closing member 252 rotates to close light-shielding cover 83 after the film-winding knob 251 is rotated by at least an angle of θ after the detecting member 255 detects that film F does not exist. Therefore, when θ is set to an angle during which the film F can be wound surely in cartridge 8, the film F is never caught by the light-shielding cover 83.

Figure 15:
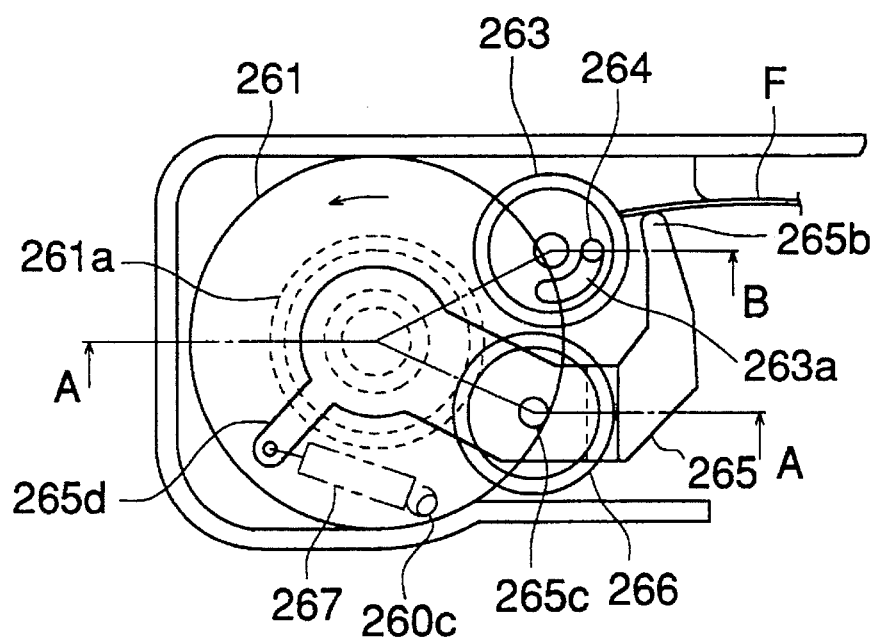
FIG. 15 is a plan view in the third example.
Figure 16:
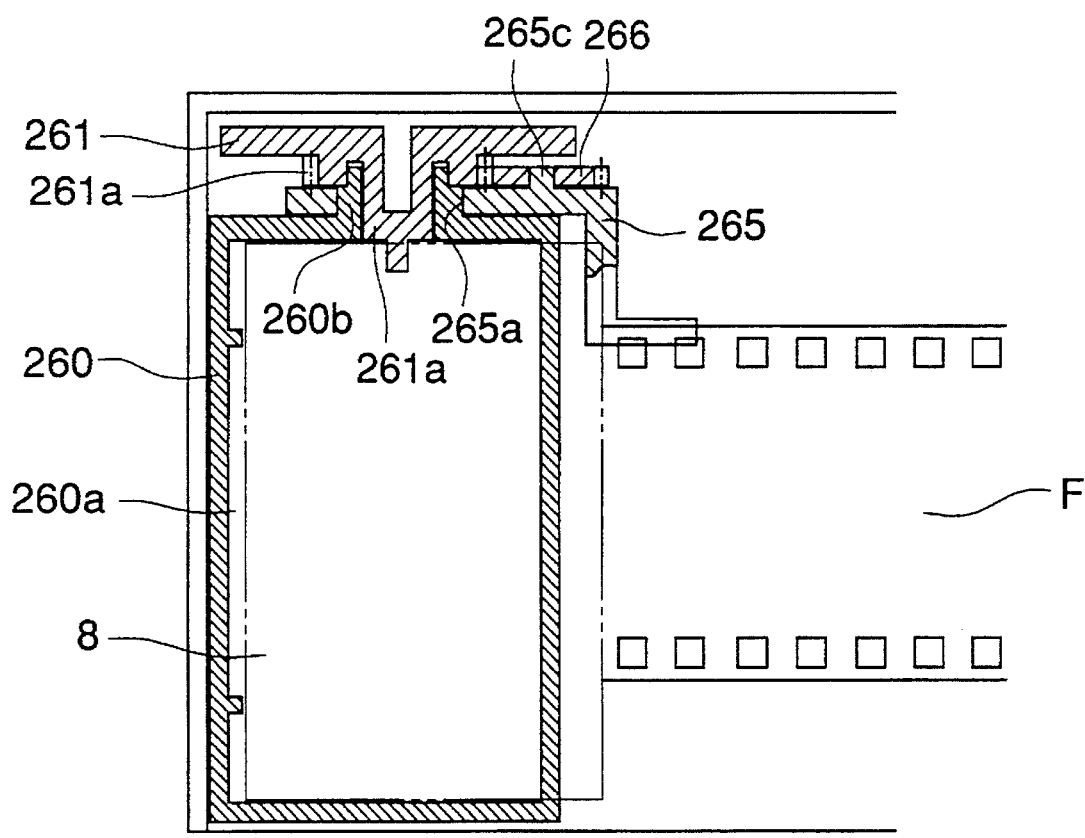
FIG. 16 is a sectional view taken on line A—A in FIG. 15.
Figure 17:
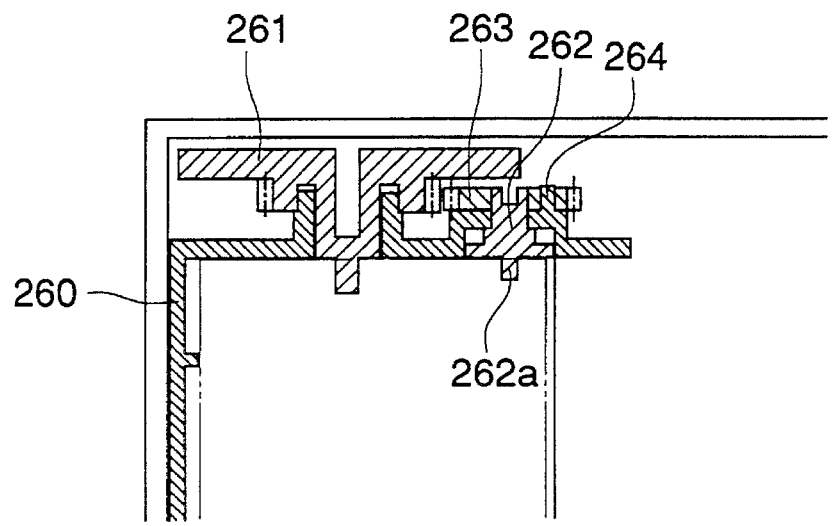
FIG. 17 is a sectional view taken on line A–B in FIG. 15.
Figure 18:
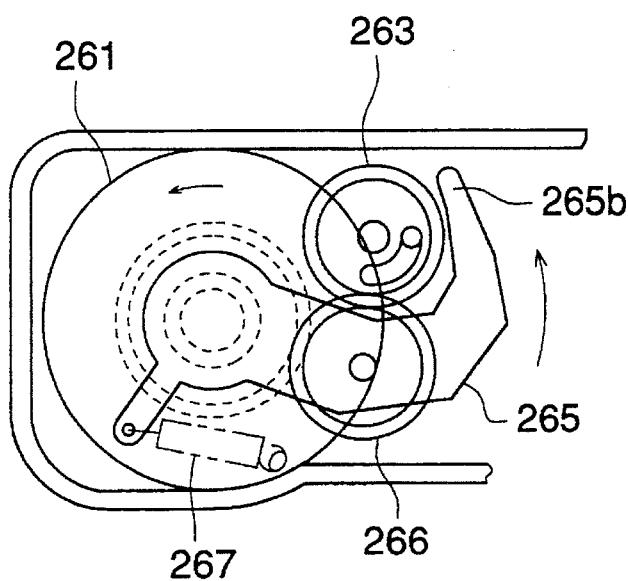
FIG. 18 is a plan view wherein a film-winding knob in FIG. 15 is rotated.
Figure 19:
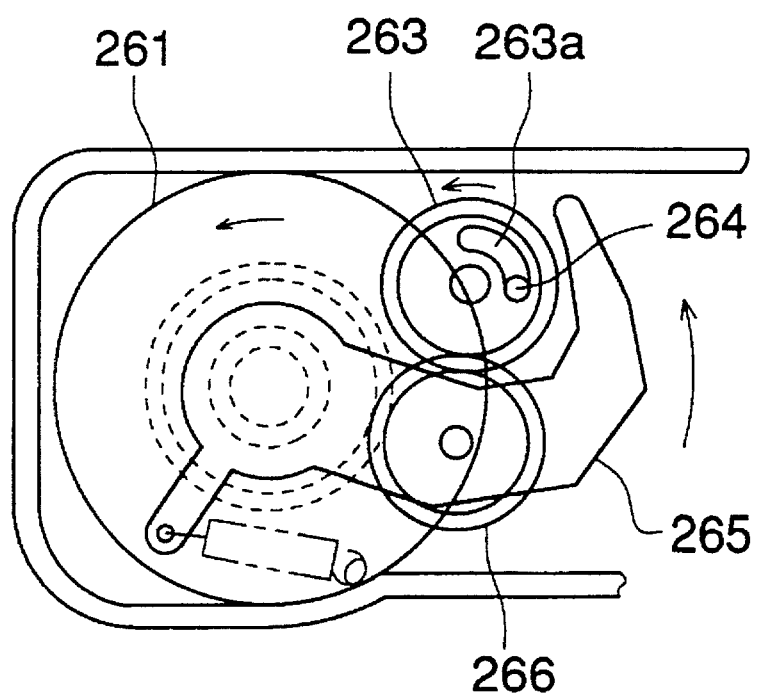
FIG. 19 is a plan view wherein a film-winding knob in FIG. 18 is further rotated.

Next, the third example of the invention will be explained as follows, referring to FIG. 15–19. FIG. 15 is a plan view of the eighth example, FIG. 16 is a sectional view taken on line A—A in FIG. 15, FIG. 17 is a sectional view taken on line A–B in FIG. 15, FIG. 18 is a plan view wherein a film-winding knob is rotated from the state in FIG. 15, and FIG. 19 is a plan view wherein the film-winding knob is further rotated from the state in FIG. 18. Incidentally, each plan view represents only main portions.

In each drawing, the numeral 260 represents a main body which holds each structural part and is loaded with cartridge 8 shown in FIG. 4 which is loaded in cartridge chamber 260*a* in the course of assembling in advance. The numeral 260 is a film-winding knob which is fit rotatably, through its shaft portion 261*a*, in main body 260 and is engaged with winding spool 81 of cartridge 8 shown in FIG. 4. Therefore, when the film-winding knob 261 is rotated counterclockwise, film F is wound in the cartridge 8. On the film-winding knob 261, there is formed first gear 261*a*.

The numeral 262 is a closing member which is fit in main body 260 and is formed integrally with the second gear 263, and tip portion 262*a* of the closing member 262 is engaged with key 84 of cartridge 8 shown in FIG. 4. On the second gear 263, there is formed elongated hole 263*a* which is a circular arc whose center is a rotating axis. The elongated hole 263*a* is engaged with stopper pin 264 planted in main body 260. Therefore, the second gear 263 can rotate only through the range of the elongated hole 263*a*, and in FIGS. 15 and 18, the light-shielding cover 83 of cartridge 8 is opened, while in FIG. 19, the light-shielding cover 83 is closed.

The numeral 265 is a detecting member that detects existence of a film, and it is fit rotatably with shaft 260*b* of main body 260 through hole 265*a* with its end portion 265*b* being in contact with film F. On the detecting member 265, there is planted shaft 265*c*, and planetary gear 266 is supported rotatably on the shaft 265*c*. Further, arm 265*d* is provided on the detecting member 265, and tension spring 267 is hooked between the tip of the arm 265*d* and protrusion 260*c* on the main body so that the detecting member 265 may be urged counterclockwise, namely in the direction that end portion 265*b* comes in contact with film F.

Operations in the constitution mentioned above will be explained as follows, referring to FIGS. 15, 18 and 19.

FIG. 15 is a diagram showing the state wherein film F is not wound in cartridge 8 yet, and end portion 265*b* of the detecting member 265 is in contact with film F, resisting tension spring 267. Therefore, when the first gear 261*a* is also rotated by the rotation of the film-winding knob 261, planetary gear 266 only runs idle and the second gear 263 does not rotate.

FIG. 18 is a diagram showing the state wherein the film-winding knob 261 is then rotated counterclockwise and film F is further wound in cartridge 8. When the film F comes off the end portion 265*b* of detecting member 265, the detecting member 265 is rotated counterclockwise by urging force of tension spring 267, and the planetary gear 266 which has been rotating together with the detecting member 265 engages with the second gear 263.

FIG. 19 is a diagram showing the state wherein the film-winding knob 261 is further rotated counterclockwise and the planetary gear 266 is engaged with the second gear 263 to rotate it counterclockwise. While the second gear 263 is rotating, film F is wound in a cartridge, and when elongated hole 263*a* of the second gear 263 comes in contact with stopper pin 264, light-shielding cover 83 of cartridge 8 is closed by closing member 262. After that, even when the film-winding knob 261 is tried to be rotated counterclockwise, its rotation is prevented by stopper pin 264.

In the constitution mentioned above, each member needs to be set so that film F may be wound in cartridge 8 before the second gear 263 finishes rotating within the range of elongated hole 263*a*.

The elongated hole 263 may also be provided on closing member 262 in place of the second gear 263.

Incidentally, cartridge 8 in the present example is drawn downward to be taken out in FIGS. 9 and 16.

As stated above, in the first example, when a photographic film exists, an urging means is locked and a light-shielding cover is caused to be in its opened state, and when a photographic film does not exist, locking of the urging means is released and a light-shielding cover is caused to be in its closed state. Therefore, when the photographic film is wound up, the light-shielding cover can be closed automatically and surely without using a motor, which is laborsaving in a photofinishing laboratory and eliminates film fogging.

Further, when a film detecting lever is in contact with a photographic film, a locking member locks operations of a cover closing member in its closing direction and thereby a light-shielding cover is opened, while, when the photographic film is wound up and thereby the film detecting lever is not in contact with a photographic film, the cover closing member operates and, interlocking with this, the locking member operates to release the locking of operations of the cover closing member in its closing direction, thus the light-shielding cover is closed. Therefore, when the photographic film is wound up, the light-shielding cover can be closed automatically and surely without using a motor, which is laborsaving in a photofinishing laboratory and eliminates film fogging.

Further, when photographing is completed after a photographic film is wound up by a film-winding knob, it is possible to look a cover closing member of a film cartridge through a window portion by turning the film-winding knob for aligning, and thereby to make sure easily that a light-shielding cover is closed. Further, when the light-shielding cover is still in its opened state because of malfunction of the cover closing member, even after completion of film-winding by means of the film-winding knob, a tool can be inserted through the window portion to operate the cover closing member for closing the light-shielding cover.

In the second and third examples, a light-shielding cover of a cartridge is automatically closed after all frames have been subjected to photographing. Therefore, even when the cartridge is taken out in a daylight room, a film is not exposed to light, and a problem of forgetting to close a light-shielding cover is not caused. Moreover, the light-shielding cover is not closed immediately after the last end of a film is detected by a detecting member, but it is closed after the film has been wound in s cartridge through film-winding for a predetermined amount made by a film-winding knob. Therefore, there is caused no problem that a film is scratched, or compulsory force is applied on a light-shielding cover to deteriorate its light-shielding capability.

What is claimed is:

1. A single-use camera, comprising:
   a film cartridge, having a light-shielding cover on a film gate, for accommodating a photographic film;
   a film-winding knob, capable of rotating, for winding said photographic film;
   a film detection member for detecting said photographic film at a position outside said film cartridge in said single-use camera by having contact only with an end portion of said photographic film; and
   a mechanism for moving said light-shielding cover to a closed position where said light-shielding cover closes said film gate when said film detection member detects absence of said photographic film at said position.

2. The single-use camera of claim 1, wherein said mechanism includes:

an urging member for constantly urging said light-shielding cover of said film cartridge toward said closed position; and a locking member for locking said urging member so that said light-shielding cover stays at an open position when said film detection member detects existence of said photographic film at said position, and for releasing said urging member so that said light-shielding cover moves to said closed position when said film detection member detects absence of said photographic film at said position.

3. The single-use camera of claim 1, wherein said mechanism includes:

a cover-closing member for closing said light-shielding cover;

an urging member for constantly urging said cover-closing member toward said closed position; and a locking member for locking said cover-closing member so that said light-shielding cover stays at an open position when said film detection member detects existence of said photographic film at said position, and for releasing said cover-closing member so that said light-shielding cover moves to said closed position when said film detection member detects absence of said photographic film at said position.

4. The camera of claim 3, wherein said film-winding knob includes a window portion for observing said cover-closing member.

5. The single-use camera of claim 1, wherein said mechanism moves said light-shielding cover to said closed position by a rotation of said film-winding knob when said film-winding knob is moved for a predetermined amount after said film detection member detects absence of said photographic film at said position.

6. The single-use camera of claim 5, wherein said mechanism includes:

a cover-closing member for closing said light-shielding cover; and wherein said film detection member locks said cover-closing member so that said light-shielding cover stays at an open position when said film detection member detects existence of said photographic film at said position, and releases said cover-closing member so that said light-shielding cover moves to a closed position when said film-winding knob is moved for a predetermined amount after said film detection member detects absence of said photographic film at said position.

7. The single-use camera of claim 5, wherein said film-winding knob has a circular wall portion with a cutout in a predetermined range, said film detection member has a first engagement portion, a second engagement portion and a third engagement portion, and said mechanism includes:

a closing member, having a first engagement portion, for closing said light-shielding cover by moving said first engagement portion toward said circular wall portion;

a first urging member for urging said closing member toward said closed position, and for urging said first engagement portion toward said circular wall portion;

a second urging member for urging said film detection member toward said photographic film outside said film cartridge, and for urging said second engagement portion toward said circular wall portion; and said third engagement portion for locking said closing member at an open position where said light-shielding cover is open;

wherein said third engagement portion releases said closing member when said film detection member detects absence of said photographic film at said position and said second engagement portion is inserted inside said circular wall portion through said cutout, and then said first engagement portion is inserted inside said circular wall portion through said cutout by a rotation of said film-winding knob so that said light-shielding cover moves to said closed position.

8. The single-use camera of claim 5, wherein said film-winding knob is rotatable on an axis and has a first gear, said film detection member is rotatable on said axis of said film-winding knob, and said mechanism includes:

a closing member, having a second gear, for closing said light-shielding cover by rotating; and a planetary gear, being coupled with said first gear, for coupling with said second gear at a coupling position and rotating said second gear by a rotation of said film-winding knob;

an urging member for urging said film detection member toward said coupling position;

wherein said planetary gear is urged to couple with said second gear by said urging member and said planetary gear rotates said second gear of said closing member so as to close said light-shielding cover by a rotation of said film-winding knob when said film detection member detects absence of said photographic film.

9. The camera of claim 8, further comprising:

a stopper member, provided on at least one of said closing member and said second gear, for stopping a rotation of said film-winding knob after said light-shielding cover is closed.

10. The camera of claim 5, further comprising:

a stopper member for stopping a rotation of said film-winding knob after said light-shielding cover is closed.

11. The camera of claim 1, wherein said light-shielding cover is moved to said closed position by a rotation of said film-winding knob, and said film detection member is urged onto said portion of said photographic film by a spring member.

12. The camera of claim 1, wherein said light-shielding cover is moved to said closed position by a first spring member, and said film detection member is urged onto said portion of said photographic film by a second spring member which is different from said first spring member.

* * * * *